(12) United States Patent
Nomichi et al.

(10) Patent No.: US 9,702,473 B2
(45) Date of Patent: Jul. 11, 2017

(54) FUSIBLE PLUG TYPE PRESSURE RELIEF VALVE

(71) Applicant: KAWASAKI JUKOGYO KABUSHIKI KAISHA, Kobe-shi, Hyogo (JP)

(72) Inventors: Kaoru Nomichi, Ono (JP); Yutaka Suzuki, Kobe (JP); Makoto Ninomiya, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 0 days.

(21) Appl. No.: 14/770,976

(22) PCT Filed: Jan. 28, 2014

(86) PCT No.: PCT/JP2014/000409
§ 371 (c)(1),
(2) Date: Aug. 27, 2015

(87) PCT Pub. No.: WO2014/136376
PCT Pub. Date: Sep. 12, 2014

(65) Prior Publication Data
US 2016/0010758 A1    Jan. 14, 2016

(30) Foreign Application Priority Data
Mar. 4, 2013 (JP) .................................. 2013-42266

(51) Int. Cl.
*F16K 17/38* (2006.01)
*F16K 24/04* (2006.01)
(52) U.S. Cl.
CPC ............ *F16K 17/383* (2013.01); *F16K 24/04* (2013.01)
(58) Field of Classification Search
CPC ................................. F16K 17/383; F16K 24/04
(Continued)

(56) References Cited

U.S. PATENT DOCUMENTS

| 1,864,380 A | 6/1932 | Te Pas |
| 4,221,231 A | 9/1980 | Harvey et al. |
| 5,632,297 A * | 5/1997 | Sciullo ................. F16K 17/383 |
| | | 137/72 |

FOREIGN PATENT DOCUMENTS

| JP | H10-184960 A | 7/1998 |
| JP | 2009-275861 A | 11/2009 |

(Continued)

OTHER PUBLICATIONS

Dec. 2, 2015 Office Action issued in Chinese Patent Application No. 201480002033.8.
(Continued)

*Primary Examiner* — Craig Schneider
*Assistant Examiner* — P. Macade Nichols
(74) *Attorney, Agent, or Firm* — Oliff PLC (57) ABSTRACT

A fusible plug type pressure relief valve includes a housing, a valve element, a spring member, and a fusible piece. A valve passage is formed in the housing. A valve element is arranged at a closed position in the housing, the closed position being a position at which the valve element closes the valve passage. The valve element is movable to an open position at which the valve element opens the valve passage. The spring member presses the valve element in an open direction. The fusible piece supports the valve element against pressing force of the spring member. The fusible piece melts at not less than a predetermined melting temperature. An inner surface of a concave portion of the fusible piece contacts the valve element. The concave portion includes a tapered portion inclined relative to an axis line of the valve element.

18 Claims, 7 Drawing Sheets

(58) Field of Classification Search
 USPC .......................................................... 137/72
 See application file for complete search history.

(56) References Cited

FOREIGN PATENT DOCUMENTS

JP  2009-275862 A   11/2009
WO  2010/136908 A1  12/2010

OTHER PUBLICATIONS

Oct. 13, 2016 Extended European Search Report issued in European Patent Application No. 14759484.0.
Sep. 8, 2015 International Preliminary Report on Patentability issued in International Patent Application No. PCT/JP2014/000409.
Apr. 15, 2014 Search Report issued in International Patent Application No. PCT/JP2014/000409.

* cited by examiner

FUSIBLE PLUG TYPE PRESSURE RELIEF VALVE

TECHNICAL FIELD

The present invention relates to a fusible plug type pressure relief valve which is provided at a gas tank and releases a gas to the atmosphere when a temperature around the tank increases.

BACKGROUND ART

If the temperature of a tank storing a high-pressure gas increases by fire or the like, the tank may burst. Therefore, the tank is provided with a pressure relief valve. When the temperature around the tank becomes a predetermined temperature, the pressure relief valve releases the gas to the atmosphere. Known as the pressure relief valve is, for example, a pressure relief valve device disclosed in PTL 1.

According to the pressure relief valve device of PTL 1, a fusible piece supports a valve element, and the position of the valve element is maintained at a closed position at which the valve element closes a valve passage. The fusible piece melts at a predetermined melting temperature to be discharged to the atmosphere. The valve element is biased by a spring member toward an open position. When the fusible piece is discharged, the valve element moves to the open position. With this, the valve passage opens, and the gas is released to the atmosphere.

CITATION LIST

Patent Literature

PTL 1: Japanese Laid-Open Patent Application Publication No. 2009-275862

SUMMARY OF INVENTION

Technical Problem

The fusible piece of the pressure relief valve device shown in FIG. 6 of PTL 1 is constituted by a fusible metal. The fusible metal is low in compressive strength, and therefore, easily causes creep deformation. Especially, when the temperature around the pressure relief valve device is close to the melting temperature, and primary pressure applied to the valve element is high, the large creep deformation occurs even in a short period of time. Therefore, the position of the valve element cannot be maintained at the closed position. In this case, the valve passage opens at all times regardless of the temperature around the pressure relief valve device. Thus, the pressure relief valve device does not serve as the pressure relief valve.

One example of a means to solve the above problem is to suppress a creep deformation amount of a supporting body that is the fusible piece in such a manner that surface pressure acting on the supporting body is reduced by increasing an outer diameter of the supporting body. However, when the outer diameter of the supporting body is increased, an outer diameter of the entire pressure relief valve device also increases. In addition, when the outer diameter of the supporting body is increased, a volume of the supporting body increases, and the amount of fusible metal used increases. The fusible metal contains rare metals in many cases and is generally expensive. Therefore, when the outer diameter of the supporting body is increased, the manufacturing cost for the pressure relief valve increases.

An object of the present invention is to provide a fusible plug type pressure relief valve capable of suppressing the creep deformation amount of the supporting body and also suppressing the increase in the outer diameter of the supporting body.

Solution to Problem

A fusible plug type pressure relief valve of the present invention includes: a housing in which a valve passage is formed; a valve element arranged at a closed position in the housing and movable to an open position, the closed position being a position at which the valve element closes the valve passage, the open position being a position at which the valve element opens the valve passage; a pressing member configured to press the valve element in an open direction that is a direction from the closed position toward the open position; and a supporting body supporting the valve element against pressing force of the pressing member and configured to melt at not less than a predetermined melting temperature, a contact surface of the supporting body contacting the valve element to support the valve element, and the contact surface of the supporting body including an inclined portion inclined relative to an axis line of the valve element.

According to the present invention, force applied from the valve element to the supporting body can be dispersed by the inclined portion of the contact surface, and therefore, the surface pressure acting on the supporting body can be reduced. With this, a creep deformation amount of the supporting body can be suppressed while suppressing the increase in the outer diameter of the supporting body.

In the above invention, the fusible plug type pressure relief valve may be configured such that: the supporting body includes a concave portion located at the valve element side; the valve element includes a convex portion located at the supporting body side, the convex portion being fitted in the concave portion; an inner peripheral surface of the concave portion contacts an outer peripheral surface of the convex portion to constitute the contact surface; and the contact surface includes the inclined portion inclined relative to the axis line of the valve element.

According to the above configuration, only a component of the pressing force acts on the contact surface, the component being perpendicular to the contact surface. Therefore, the force acting on the contact surface can be reduced. With this, the surface pressure acting on the contact surface can be reduced. In other words, since the surface area of the contact surface which receives the pressing force increases, the surface pressure acting on the contact surface can be reduced.

In the above invention, the fusible plug type pressure relief valve may be configured such that: the valve element includes a concave portion located at the supporting body side; the supporting body includes a convex portion located at the valve element side, the convex portion being fitted in the concave portion; an outer peripheral surface of the convex portion contacts an inner peripheral surface of the concave portion to constitute the contact surface; and the contact surface includes the inclined portion inclined relative to the axis line of the valve element.

According to the above configuration, only a component of the pressing force acts on the contact surface, the component being perpendicular to the contact surface. Therefore, the force acting on the contact surface can be reduced.

With this, the surface pressure acting on the contact surface can be reduced. In other words, since the surface area of the contact surface which receives the pressing force increases, the surface pressure acting on the contact surface can be reduced.

In the above invention, the fusible plug type pressure relief valve may be configured such that each of the convex portion and the concave portion has a substantially truncated cone shape.

According to the above configuration, since an edge portion having an acute angle is not formed on the contact surface, stress concentration can be prevented from occurring on the contact surface. With this, the creep deformation amount of the supporting body can be further suppressed.

In the above invention, the fusible plug type pressure relief valve may be configured such that each of the convex portion and the concave portion has a substantially partially spherical shape.

According to the above configuration, since the contact surface is smoothly formed, the stress concentration can be prevented from occurring on the contact surface. With this, the creep deformation amount of the supporting body can be further suppressed.

In the above invention, the fusible plug type pressure relief valve may be configured such that: the supporting body includes a supporting surface which contacts and is supported by the housing; and the supporting surface is inclined relative to the axis line of the valve element.

According to the above configuration, the supporting surface is inclined relative to the axis line of the valve element. Therefore, only a component of the reaction force can be caused to act on the supporting surface, the component being perpendicular to the supporting surface. With this, the force acting on the supporting surface can be reduced, and therefore, the surface pressure acting on the supporting surface can be reduced. In other words, since the surface area of the supporting surface which receives the pressing force increases, the surface pressure acting on the supporting surface can be reduced. Therefore, the creep deformation amount of the supporting body can be suppressed while suppressing the increase in the outer diameter of the supporting body.

A fusible plug type pressure relief valve of the present invention includes: a housing in which a valve passage is foamed; a valve element arranged at a closed position in the housing and movable to an open position, the closed position being a position at which the valve element closes the valve passage, the open position being a position at which the valve element opens the valve passage; a pressing member configured to press the valve element in an open direction that is a direction from the closed position toward the open position; a supporting body supporting the valve element against pressing force of the pressing member and configured to melt at not less than a predetermined melting temperature; and a porous member interposed between the supporting body and the valve element, the supporting body including a contact surface between the supporting body and the porous member and contacting the porous member to support the valve element.

According to the present invention, a plurality of depressions and projections are formed on a surface of the porous member. Therefore, a large number of inclined portions are formed on the contact surface, so that the force acting on the contact surface can be dispersed. In other words, since the supporting body contacts the porous member, the surface area of the contact surface increases. Therefore, the surface pressure acting on the contact surface can be reduced. With this, the surface pressure acting on the supporting body can be reduced. Thus, the creep deformation amount of the supporting body can be suppressed while suppressing the increase in the outer diameter of the supporting body.

In the above invention, the fusible plug type pressure relief valve may be configured such that the porous member is a porous body or wire mesh mold product which is constituted by ceramics or a sintered member.

According to the above configuration, a plurality of depressions and projections are moderately formed on a surface of the porous member. With this, the surface pressure acting on the supporting body can be reduced. Thus, the creep deformation amount of the supporting body can be suppressed while suppressing the increase in the outer diameter of the supporting body.

A fusible plug type pressure relief valve of the present invention includes: a housing in which a valve passage is formed; a valve element arranged at a closed position in the housing and movable to an open position, the closed position being a position at which the valve element closes the valve passage, the open position being a position at which the valve element opens the valve passage; a pressing member configured to press the valve element toward the open position from the closed position; and a supporting body supporting the valve element against pressing force of the pressing member and configured to melt at not less than a predetermined melting temperature, the supporting body including a supporting surface which contacts and is supported by the housing, and the supporting surface is inclined relative to an open direction.

According to the present invention, the supporting surface is inclined relative to the axis line of the valve element. Therefore, only a component of the reaction force can be caused to act on the supporting surface, the component being perpendicular to the supporting surface. With this, the force acting on the supporting surface can be reduced, and therefore, the surface pressure acting on the supporting surface can be reduced. In other words, since the surface area of the supporting surface which receives the pressing force increases, the surface pressure acting on the supporting surface can be reduced. Therefore, the creep deformation amount of the supporting body can be suppressed while suppressing the increase in the outer diameter of the supporting body.

Advantageous Effects of Invention

According to the present invention, the creep deformation amount of the supporting body can be suppressed while suppressing the increase in the outer diameter of the supporting body.

The above object, other objects, features, and advantages of the present invention will be made clear by the following detailed explanation of preferred embodiments with reference to the attached drawings.

DESCRIPTION OF EMBODIMENTS

Hereinafter, fusible plug type pressure relief valves 1 and 1A to 1E of the first to sixth embodiments of the present invention will be explained in reference to the drawings. Directions stated in the following explanations are used for convenience sake, and the directions and the like of components of the present invention are not limited to the stated directions. The fusible plug type pressure relief valves 1 and 1A to 1E explained below are just embodiments of the present invention. Therefore, the present invention is not limited to the embodiments, and additions, deletions, and modifications may be made within the scope of the present invention. To be specific, another embodiment may be formed by deleting the components of the embodiments or combining the components of the embodiments.

First Embodiment

Figure 1:
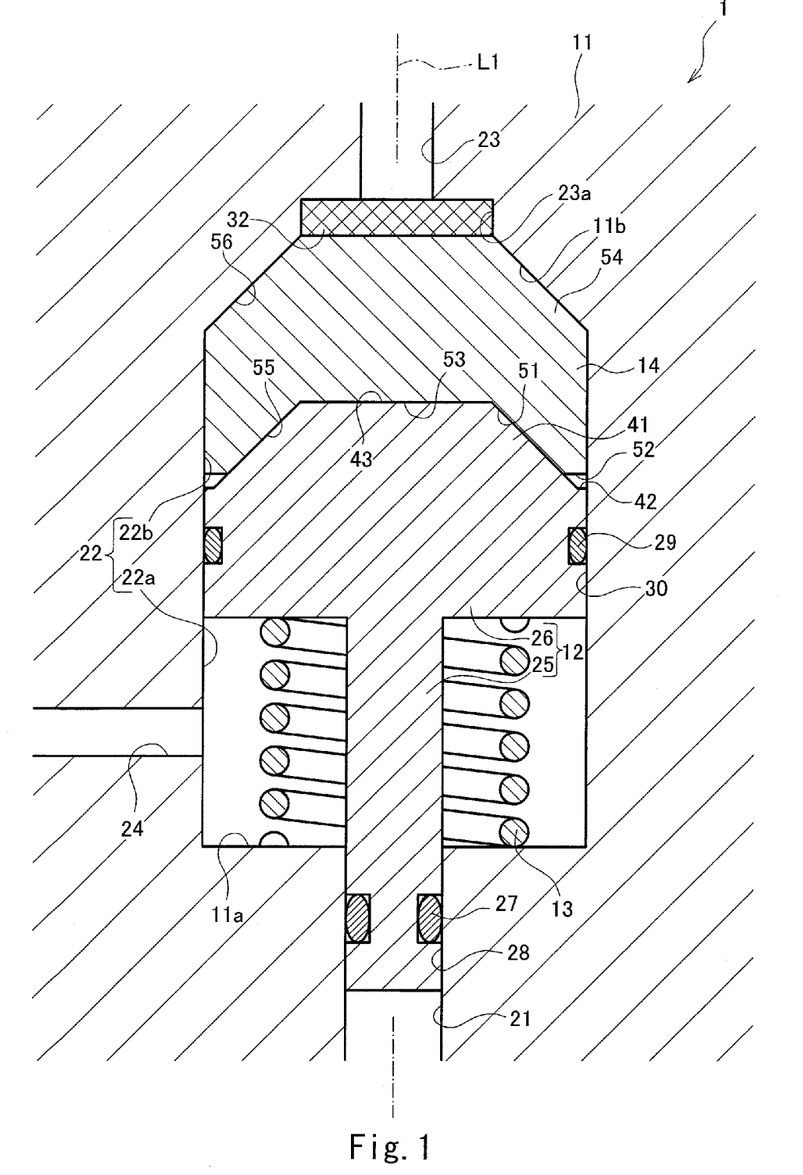
FIG. 1 is a cross-sectional view showing a fusible plug type pressure relief valve of a first embodiment.

A gas tank is provided with a fusible plug type pressure relief valve 1. When a temperature around a pressure apparatus increases at the time of fire or the like to become a predetermined temperature, the fusible plug type pressure relief valve 1 releases a gas in the tank to the atmosphere. Hereinafter, the fusible plug type pressure relief valve 1 provided at the tank will be explained in detail.

The fusible plug type pressure relief valve 1 includes a housing 11, a valve element 12, a spring member 13, and a fusible piece 14. The housing 11 includes a valve passage 21, a valve space 22, a discharge passage 23, and an atmosphere communication passage 24. The valve passage 21 is connected to the tank, and the gas in the tank is introduced to the valve passage 21. The valve passage 21 is connected to the valve space 22, and the valve space 22 is larger in diameter than the valve passage 21. The valve space 22 is connected to the discharge passage 23 and the atmosphere communication passage 24, and the discharge passage 23 and the atmosphere communication passage 24 are open to the atmosphere. In the housing 11 configured as above, the valve passage 21, the valve space 22, and the discharge passage 23 extend along an axis line L1 of the valve element, and the atmosphere communication passage 24 extends in a direction intersecting with (in the present embodiment, perpendicular to) the axis line L1. The valve element 12 is arranged in the valve space 22 of the housing 11.

The valve element 12 is arranged at a closed position at which the valve element 12 closes the valve passage 21. When the valve element 12 is moved along the axis line L1 from the closed position, the valve element 12 reaches an open position at which the valve element 12 opens the valve passage 21. The valve element 12 configured as above includes a rod 25 formed at a tip end side of the valve element 12 and a piston 26 formed at a base end side of the valve element 12. The rod 25 has a substantially rod shape. When the valve element 12 is located at the closed position, a tip end portion of the rod 25 is inserted through the valve passage 21. An annular first seal 27 is fitted to an outer peripheral surface of the tip end portion of the rod 25. The first seal 27 seals between an inner peripheral surface 28 defining the valve passage 21 and the rod 25 entirely in a circumferential direction. Thus, the valve passage 21 is closed. When the valve element 12 is moved to the open position, the first seal 27 comes off from the valve passage 21. When the first seal 27 comes off from the valve passage 21, the valve passage 21 opens to be connected to the valve space 22. The piston 26 is integrally provided at a base end portion of the rod 25 configured as above.

The piston 26 has a substantially disc shape. An outer diameter of the piston 26 is larger than an outer diameter of the rod 25. A lower end portion of the piston 26 opposes to a bottom surface 11a of the housing 11. The rod 25 is integrally provided at the lower end portion of the piston 26. An upper end portion of the piston 26 opposes to a ceiling surface 11b of the housing 11 and forms a convex portion 41. The convex portion 41 has a substantially truncated cone shape projecting toward the ceiling surface 11b of the housing 11 (i.e., toward the open position) and is formed along the axis line L1. An annular second seal 29 is fitted to an outer peripheral surface of the piston 26. The second seal 29 seals between an inner peripheral surface 30 defining the valve space 22 and the piston 26 entirely in the circumferential direction. The second seal 29 divides the valve space 22 into a first region 22a and a second region 22b. The first region 22a is a region connected to the valve passage 21 and the atmosphere communication passage 24. The second region 22b is a region connected to the discharge passage 23.

The valve element 12 configured as above moves in the valve space 22 along the axis line L1 from the closed position to the open position while maintaining a sealed state between the inner peripheral surface 30 and the piston 26. When the valve element 12 moves to the open position, the valve passage 21 opens. To move the valve element 12 to the open position, the spring member 13 is provided in the first region 22a of the valve space 22.

The spring member 13 that is a pressing member is a so-called compression coil spring. The spring member 13 is interposed between a lower end portion of the piston 26 and the bottom surface 11a of the housing 11. The spring member 13 biases (presses) the piston 26 along the axis line L1 in an open direction from the closed position toward the open position. The valve element 12 moves to the open position by biasing force of the spring member 13. To support the valve element 12 against the biasing force and maintain the valve element 12 at the closed position, the fusible piece 14 is provided in the second region 22b of the valve space 22.

Figure 2:
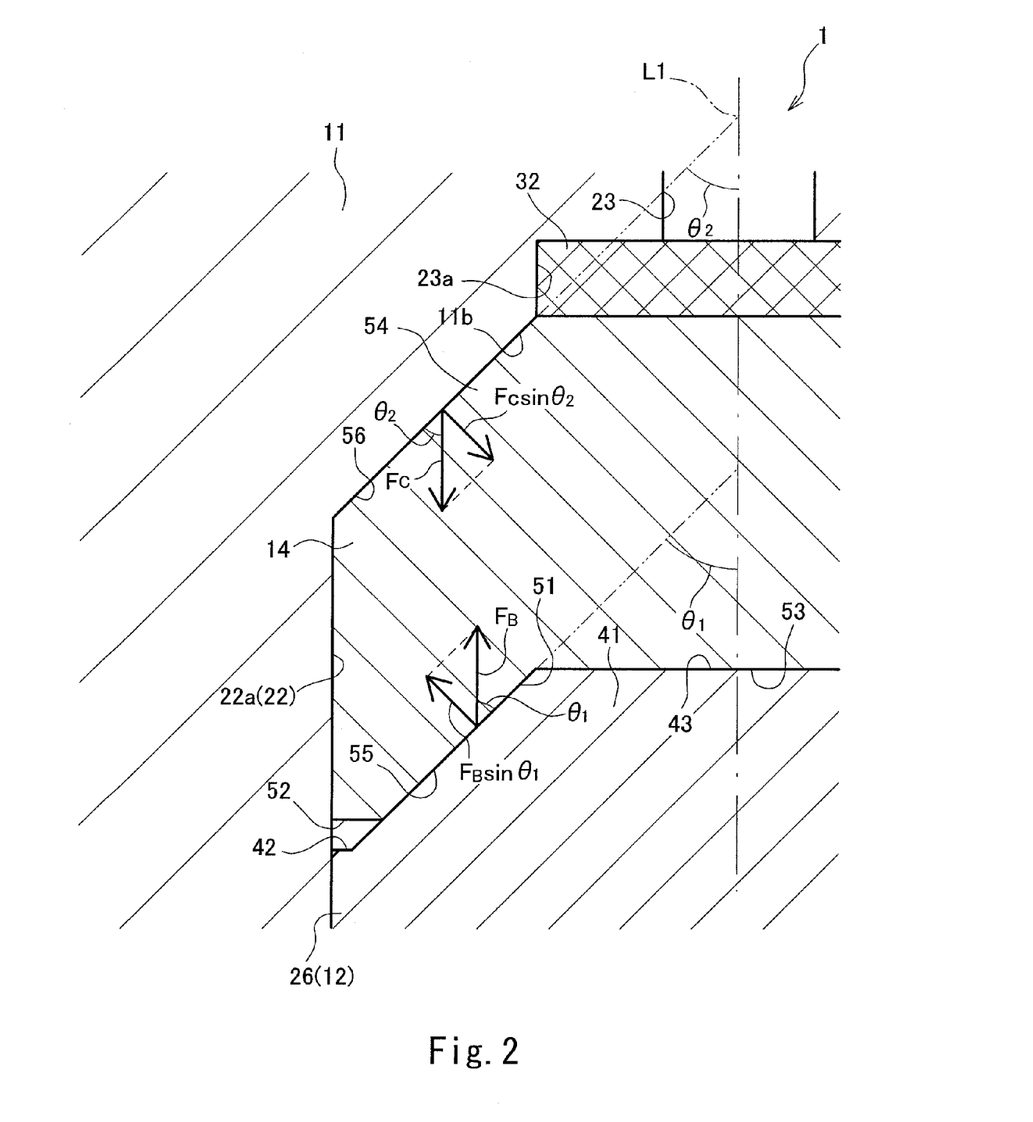
FIG. 2 is an enlarged cross-sectional view showing the vicinity of a fusible piece of the fusible plug type pressure relief valve of FIG. 1.

The fusible piece 14 that is a supporting body has a substantially disc shape. The fusible piece 14 is interposed between the ceiling surface 11b of the housing 11 and the convex portion 41 of the valve element 12. A lower end portion of the fusible piece 14 opposes to the convex portion 41. A concave portion 51 is formed at the lower end portion of the fusible piece 14. The concave portion 51 has a substantially truncated cone shape corresponding to the shape of the convex portion 41. To be specific, the concave portion 51 has a substantially truncated cone shape that is concave toward the ceiling surface 11b (i.e., toward the open position). The concave portion 51 is formed along the axis line L1. The convex portion 41 is fitted in the concave portion 51 such that an outer surface of the convex portion 41 contacts an inner surface of the concave portion 51. To be specific, the concave portion 51 of the fusible piece 14 is formed at the valve element 12 side, and the convex portion 41 of the valve element 12 is formed at the fusible piece 14 side.

An outer peripheral edge 52 of the lower end portion of the fusible piece 14 opposes to an outer peripheral edge 42 of the upper end portion of the piston 26. These two outer peripheral edges 52 and 42 are flat and arranged so as to be separated from each other in a direction parallel to the axis line L1. With this, the convex portion 41 can be fitted in the concave portion 51 such that the outer surface of the convex portion 41 tightly contacts the inner surface of the concave portion 51. Thus, a large contact area where the convex portion 41 and the concave portion 51 contact each other can be secured. It should be noted that the outer peripheral edges 52 and 42 do not have to be separated from each other, and the outer peripheral edges 52 and 42 may contact each other. In this case, by forming a gap between a below-described ceiling 53 of the fusible piece 14 and a below-described tip end 43 of the convex portion 41, the convex portion 41 can be fitted in the concave portion 51 such that the outer surface of the convex portion 41 tightly contacts the inner surface of the concave portion 51.

An upper end portion of the fusible piece 14 opposes to the ceiling surface 11b of the housing 11 and forms a convex portion 54. The convex portion 54 has a substantially truncated cone shape projecting toward the ceiling surface 11b and is formed along the axis line L1. The ceiling surface 11b also has a substantially truncated cone shape corresponding to the shape of the convex portion 54. An outer surface of the convex portion 54 contacts and is fitted in the ceiling surface 11b. To be specific, the convex portion 54 of the fusible piece 14 is formed at the housing 11 side.

The fusible piece 14 configured as above is made of a low melting point alloy. The fusible piece 14 melts at a predetermined melting temperature. An opening 23a of the discharge passage 23 is formed on the ceiling surface 11b. A porous member 32 is arranged at the opening 23a. The melted fusible piece 14 is introduced through the porous member 32 to the discharge passage 23 to be discharged through the discharge passage 23 to the atmosphere. With this, the second region 22b becomes empty, and the position of the valve element 12 cannot be maintained at the closed position. Thus, the valve element 12 biased by the spring member 13 moves to the open position. Therefore, the valve passage 21 opens to be connected to the first region 22a, and the gas in the tank is introduced through the valve passage 21 to the first region 22a to be released through the atmosphere communication passage 24 to the atmosphere.

In the fusible plug type pressure relief valve 1 having such functions, the valve element 12 is biased by the spring member 13. Therefore, the biasing force is applied to the fusible piece 14 through the valve element 12. To be specific, the spring member 13 presses the fusible piece 14 through the valve element 12. In addition, since the gas introduced to the valve passage 21 from the tank is sealed by the first seal 27, a load corresponding to the pressure of the gas in the tank also presses the fusible piece 14 through the valve element 12. In the pressure relief valve of a conventional art, since a lower end surface (contact surface) of the fusible piece is perpendicular to the axis line L1, almost all the biasing force acting on the valve element 12 is received by the fusible piece as pressing force. On the other hand, in the fusible plug type pressure relief valve 1, a tapered portion 55 (contact surface) of an inner surface of the fusible piece 14 forms an angle $\theta_1$ (for example, 30 to 60 degrees) relative to the axis line L1 (i.e., relative to the open direction). Therefore, force received by the tapered portion 55 of the inner surface of the fusible piece 14 becomes a component $F_B \sin \theta_1$ of biasing force $F_B$. On this account, surface pressure acting on the fusible piece 14 can be made lower than that of the conventional art. In other words, since the tapered portion 55 is formed on the contact surface of the fusible piece 14, a pressure receiving surface which receives the biasing force $F_B$ increases, and therefore, the surface pressure acting on the fusible piece 14 can be reduced. With this, the creep deformation amount of the fusible piece 14 and the increase in the outer diameter of the fusible piece 14 can be suppressed. By suppressing the increase in the outer diameter of the fusible piece 14, the volume of the fusible piece 14 can be reduced. With this, the amount of fusible piece 14 used can be suppressed, so that the fusible plug type pressure relief valve 1 can be produced at low cost.

Since each of the concave portion 51 of the fusible piece 14 and the convex portion 41 of the valve element 12 has the truncated cone shape, a flat surface is formed on each of the ceiling 53 of the concave portion 51 and the tip end 43 of the convex portion 41. With this, the stress concentration caused when each of the concave portion 51 and the convex portion 41 has a conical shape can be prevented, and therefore, the deformation of the fusible piece 14 by the stress concentration can be suppressed.

In the fusible plug type pressure relief valve 1, the convex portion 54 contacts and is fitted in the ceiling surface 11b and is supported by the ceiling surface 11b in a valve-closed state. To support the convex portion 54 against the biasing force acting on the valve element 12, the ceiling surface 11b applies reaction force to the convex portion 54 in an axial direction. The ceiling surface 11b has a substantially truncated cone shape together with the convex portion 54 of the fusible piece 14. A tapered portion 56 (supporting surface) of the outer surface of the convex portion 54 forms an angle $\theta_2$ (for example, 30 to 60 degrees; in the present embodiment, $\theta_1$ and $\theta_2$ are equal to each other) relative to the axis line L1. Therefore, force received by the tapered portion 56 of the outer surface of the convex portion 54 becomes a component $F_C \sin \theta$ of reaction force $F_C$. On this account, the surface pressure acting on the fusible piece 14 can be made lower than that of the pressure relief valve of the conventional art in which almost all the reaction force acts on the fusible piece. In other words, since the tapered portion 56 is formed on the supporting surface of the fusible piece 14, the pressure receiving surface which receives the reaction force $F_C$ increases, and therefore, the surface pressure acting on the fusible piece 14 can be reduced. With this, the creep deformation amount of the fusible piece 14 and the increase in the outer diameter of the fusible piece 14 can be suppressed. By suppressing the increase in the outer diameter of the fusible piece 14, the volume of the fusible piece 14 can be reduced. With this, the amount of fusible piece 14 used can be suppressed. Thus, the fusible plug type pressure relief valve 1 can be produced at low cost.

Second Embodiment

A fusible plug type pressure relief valve 1A of the second embodiment is similar in configuration to the fusible plug type pressure relief valve 1 of the first embodiment. The following will mainly explain components of the fusible plug type pressure relief valve 1A of the second embodiment, the components being different from the components of the fusible plug type pressure relief valve 1 of the first embodiment. The same reference signs are used for the same components, and explanations thereof may be omitted. The same is true for the fusible plug type pressure relief valves 1B to 1E of the third to sixth embodiments and a fusible plug type pressure relief valve 1F of another embodiment.

Figure 3:
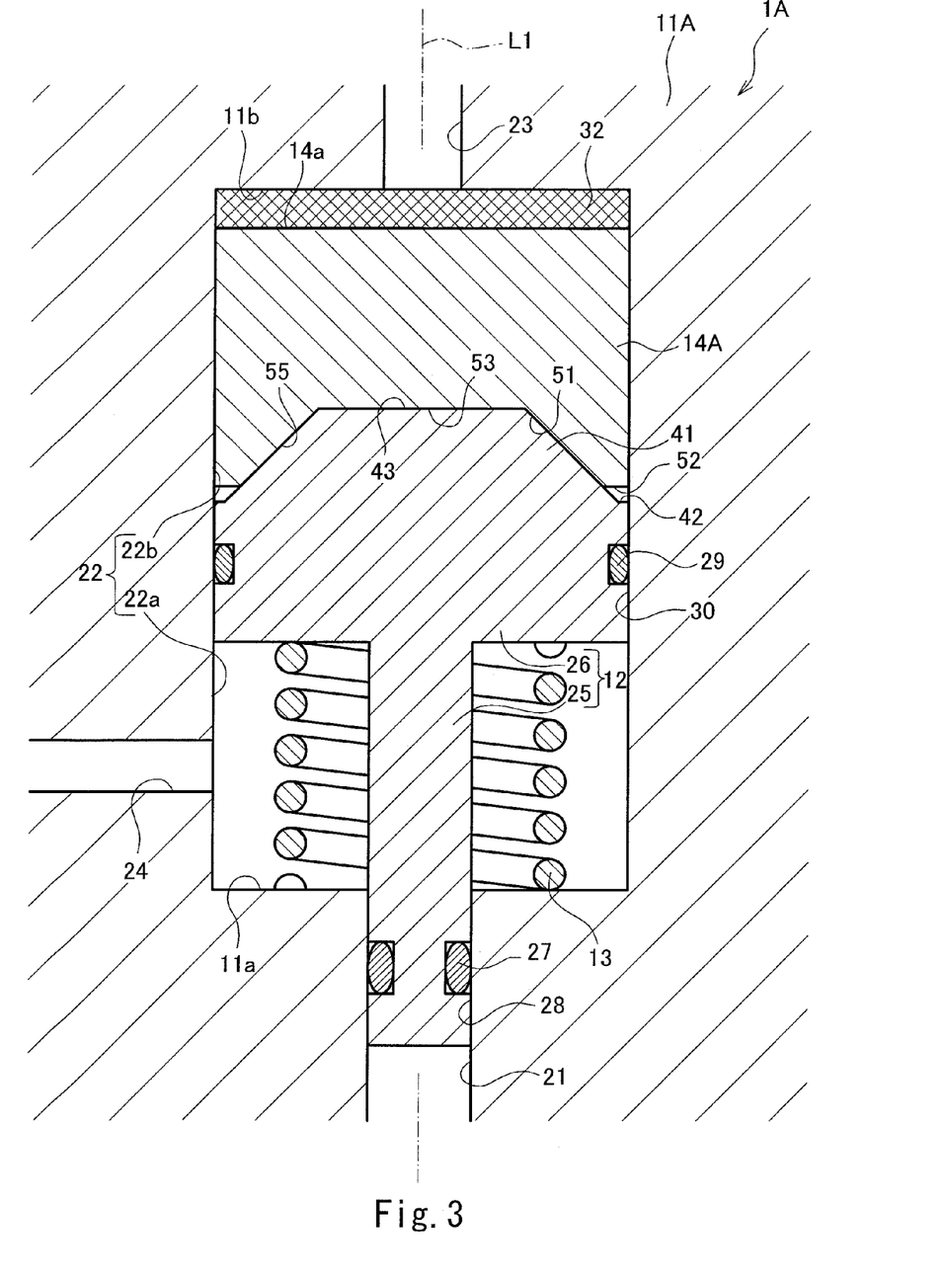
FIG. 3 is a cross-sectional view showing the fusible plug type pressure relief valve of a second embodiment.

As shown in FIG. 3, in the fusible plug type pressure relief valve 1A, an upper end surface 14a of a fusible piece 14A is a flat surface perpendicular to the axis line L1. An outer diameter of the porous member 32 is substantially equal to an outer diameter of the fusible piece 14A. The porous member 32 covers the entire upper end surface 14a (supporting surface) of the fusible piece 14A. Therefore, the porous member 32 is interposed between the upper end surface 14a of the fusible piece 14A and the ceiling surface 11b of a housing 11A, and the fusible piece 14A contacts and is supported by the ceiling surface 11b of the housing 11 through the porous member 32. For example, the porous member 32 is a porous body or wire mesh mold product which is constituted by ceramics or a sintered member. The porous member 32 which supports the fusible piece 14A as above is a member including a large number of holes and having a substantially disc shape. A lower surface of the porous member 32 has projections and depressions. Therefore, a large number of inclined portions are formed on the upper end surface 14a of the fusible piece 14A, so that the reaction force acting on the fusible piece 14A from the ceiling surface 11b can be dispersed. With this, the surface pressure acting on the fusible piece 14A can be reduced. Thus, the creep deformation amount of the fusible piece 14A and the increase in the outer diameter of the fusible piece 14A can be suppressed.

Other than the above, the fusible plug type pressure relief valve 1A has the same operational advantages as the fusible plug type pressure relief valve 1 of the first embodiment.

Third Embodiment

Figure 4:
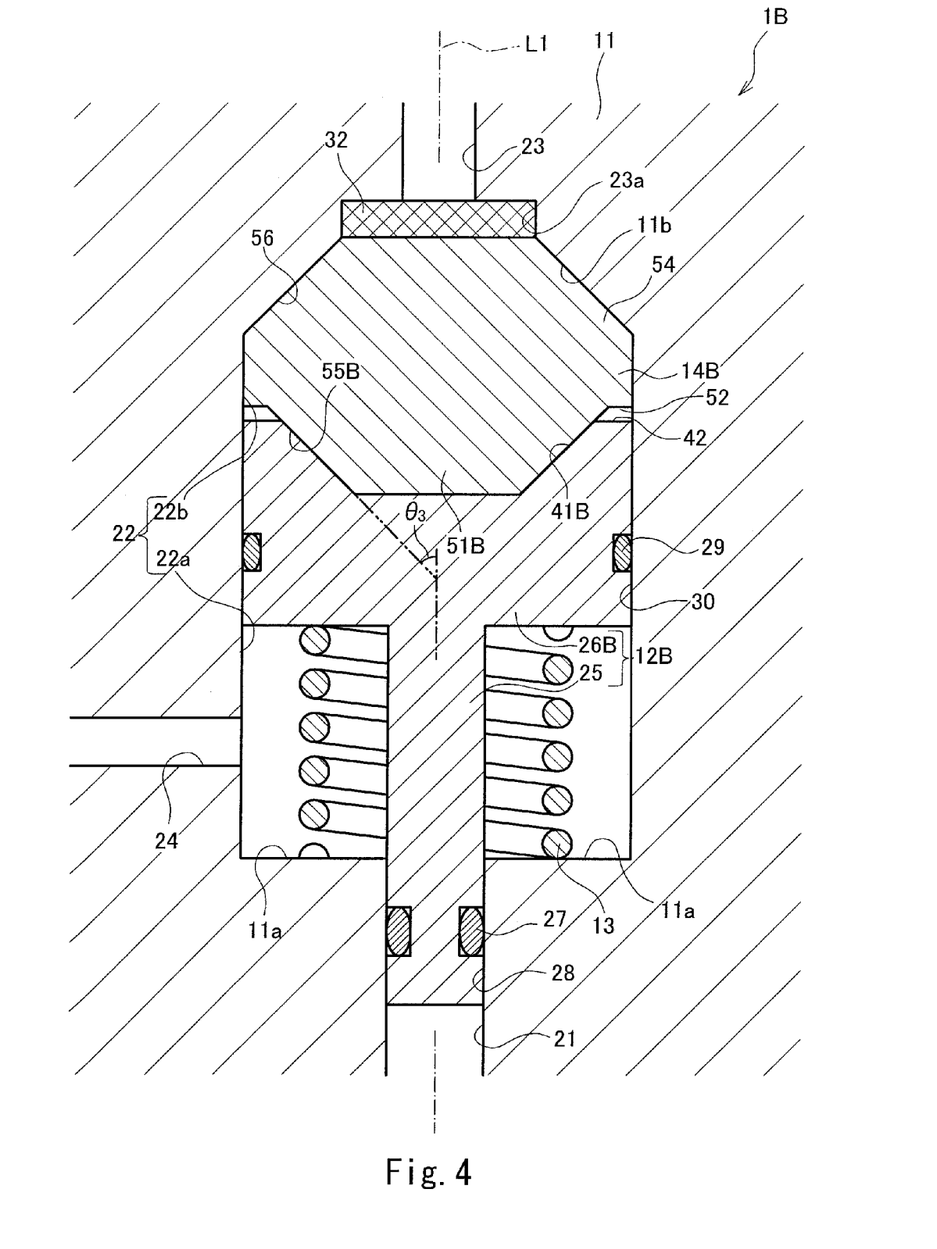
FIG. 4 is a cross-sectional view showing the fusible plug type pressure relief valve of a third embodiment.

As shown in FIG. 4, in a fusible plug type pressure relief valve 1B of the third embodiment, a concave portion 41B is formed at an upper end portion of a piston 26B of a valve element 12B. The concave portion 41B has a substantially truncated cone shape that is concave toward the bottom surface 11a of the housing 11 (i.e., toward the closed position). The concave portion 41B is formed along the axis line L1. A lower end portion of the fusible piece 14B forms a convex portion 51B. The convex portion 51B has a substantially truncated cone shape corresponding to the shape of the concave portion 41B of the piston 26B. To be specific, the convex portion 51B has a substantially truncated cone shape projecting toward the bottom surface 11a of the housing 11 (i.e., toward the closed position). The convex portion 51B is formed along the axis line L1. The convex portion 51B having such a shape is fitted in the concave portion 41B such that an outer surface of the convex portion 51B contacts an inner surface of the concave portion 41B of the piston 26B. To be specific, the convex portion 51B of the fusible piece 14 is formed at the valve element 12 side, and the concave portion 41B of the valve element 12 is formed at the fusible piece 14 side.

In the fusible plug type pressure relief valve 1B configured as above, a tapered portion 55B (contact surface) of the outer surface of the convex portion 51B forms an angle $\theta_3$ (for example, 30 to 60 degrees) relative to the axis line L1. Therefore, force received by the tapered portion 55B of the inner surface of the fusible piece 14B becomes a component $F_B \sin \theta_3$ of biasing force $F_B$. On this account, the surface pressure acting on the fusible piece 14B can be made lower than that of the conventional art. In other words, since the tapered portion 55B is formed on the contact surface of the fusible piece 14, the pressure receiving surface which receives the biasing force $F_B$ increases, and therefore, the surface pressure acting on the fusible piece 14 can be reduced. With this, the creep deformation amount of the fusible piece 14B and the increase in the outer diameter of the fusible piece 14B can be suppressed.

Other than the above, the fusible plug type pressure relief valve 1B has the same operational advantages as the fusible plug type pressure relief valve 1 of the first embodiment.

Fourth Embodiment

Figure 5:
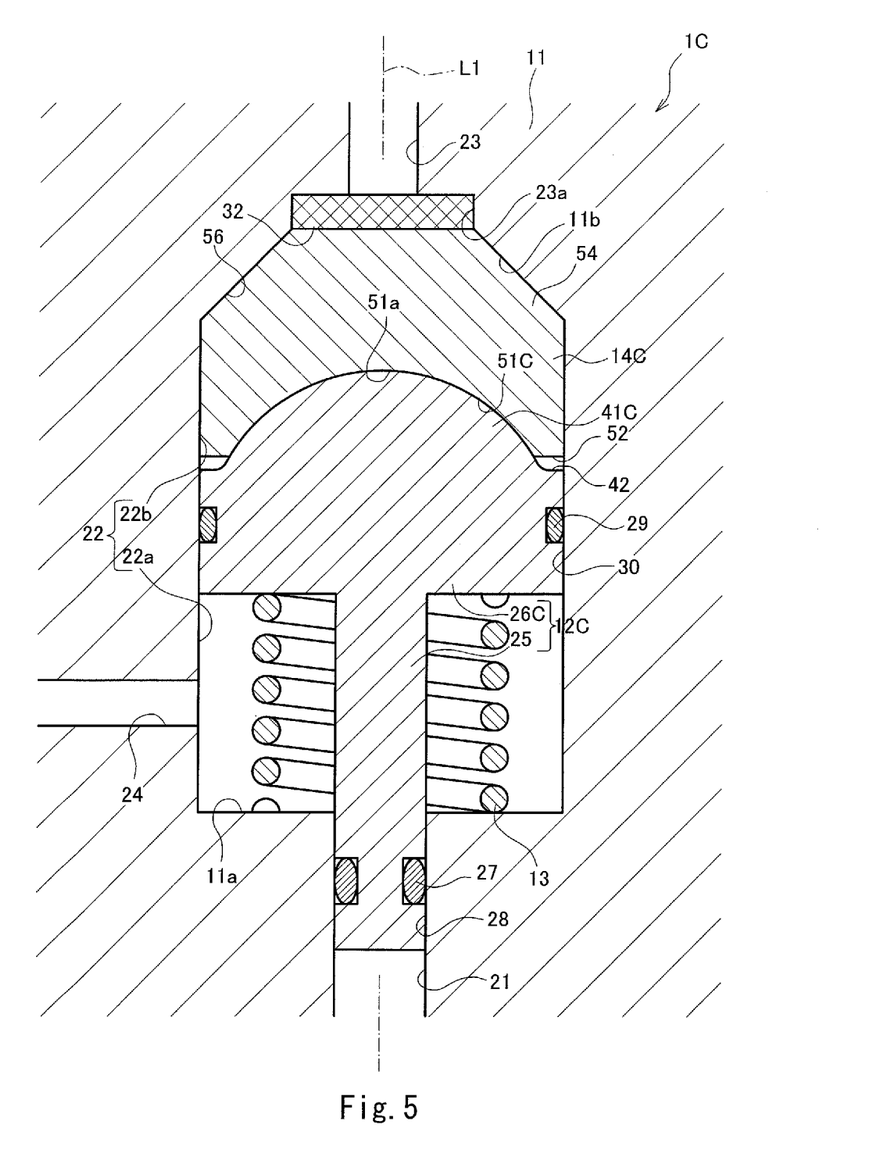
FIG. 5 is a cross-sectional view showing the fusible plug type pressure relief valve of a fourth embodiment.

As shown in FIG. 5, in a fusible plug type pressure relief valve 1C of the fourth embodiment, an upper end portion of a piston 26C of a valve element 12C forms a convex portion 41C. The convex portion 41C has a substantially partially spherical shape projecting toward the ceiling surface 11b of the housing 11 (i.e., toward the open position). The convex portion 41C is fanned along the axis line L1. A concave portion 51C is formed at a lower end portion of a fusible piece 14C. The concave portion 51C has a substantially partially spherical shape corresponding to the shape of the convex portion 41C of the piston 26C. To be specific, the concave portion 51C has a substantially partially spherical shape that is concave toward the ceiling surface 11b of the housing 11 (i.e., toward the open position). The concave portion 51C is formed along the axis line L1. The convex portion 41C of the piston 26C is fitted in the concave portion 51C having such a shape. An outer surface of the convex portion 41C of the piston 26C contacts an inner surface 51a (contact surface) of the concave portion 51C. To be specific, the concave portion 51C of the fusible piece 14 is formed at the valve element 12 side, and the convex portion 41C of the valve element 12 is formed at the fusible piece 14 side.

In the fusible plug type pressure relief valve 1C configured as above, the inner surface 51a of the concave portion 51C has a partially spherical shape. With this, an inclination angle of an inner surface of the concave portion 51C relative to the open direction in which the pressing force acts changes continuously. Therefore, even the concave portion 51C having such a partially spherical shape can disperse the pressing force. With this, the surface pressure acting on the fusible piece 14C can be made lower than that of the conventional art. Thus, the creep deformation amount of the fusible piece 14C and the increase in the outer diameter of the fusible piece 14C can be suppressed.

Other than the above, the fusible plug type pressure relief valve 1A has the same operational advantages as the fusible plug type pressure relief valve 1 of the first embodiment.

Fifth Embodiment

Figure 6:
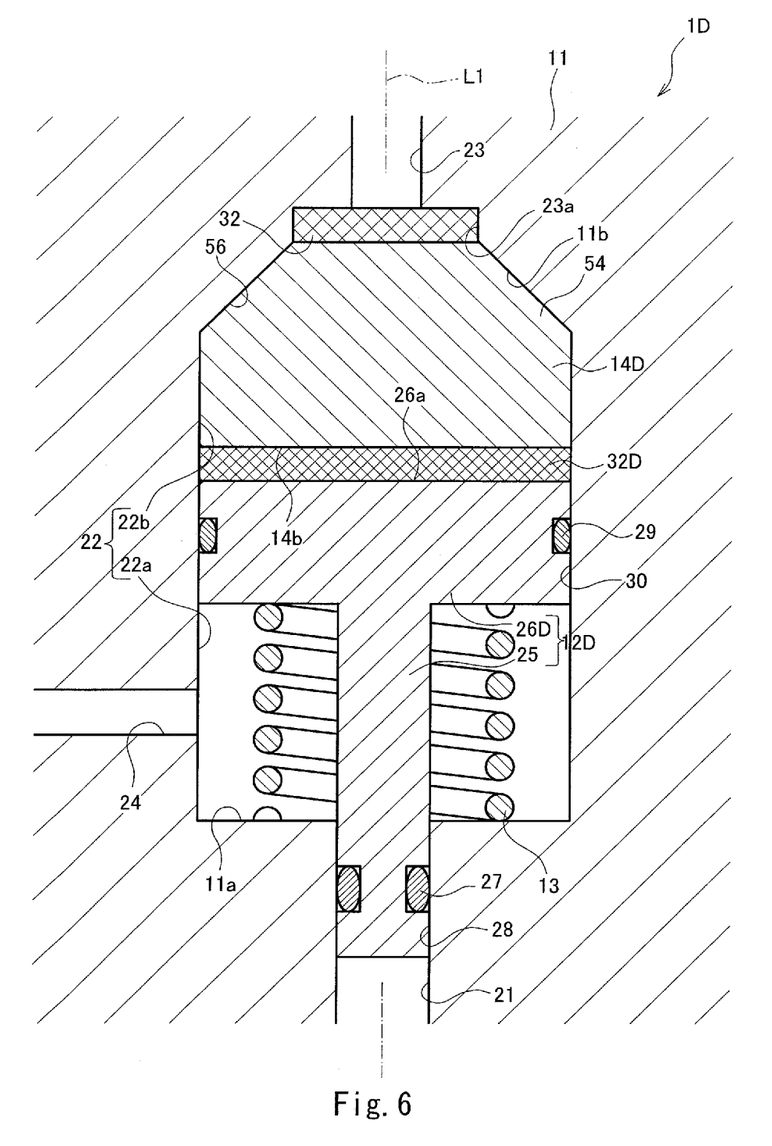
FIG. 6 is a cross-sectional view showing the fusible plug type pressure relief valve of a fifth embodiment.

As shown in FIG. 6, in a fusible plug type pressure relief valve 1D of the fifth embodiment, a lower end surface 14b of the fusible piece 14D and an upper end surface 26a of the valve element 12D (i.e., the upper end surface 26a of a piston 26D) are substantially flat, and the porous member 32 is interposed between the lower end surface 14b and the upper end surface 26a. A porous member 32D is a member having a substantially disc shape. An outer diameter of the porous member 32D is substantially equal to each of an outer diameter of the valve element 12D and an outer diameter of the fusible piece 14D. Therefore, the lower end surface 14b (contact surface) of the fusible piece 14D contacts the valve element 12D through the porous member 32 to support the valve element 12D. The porous member 32D includes a large number of holes, and each of upper and lower end surfaces of the porous member 32D has projections and depressions. For example, the porous member 32D is a porous body or wire mesh mold product which is constituted by ceramics or a sintered member. Therefore, a large number of inclined portions are formed on the lower end surface 14b of the fusible piece 14D, so that force acting on the lower end surface of the fusible piece 14D is dispersed by the porous member 32D. In other words, since the supporting body contacts the porous member 32, the surface area of the contact surface increases, and therefore, the surface pressure acting on the contact surface can be reduced. With this, the surface pressure acting on the fusible piece 14D can be reduced. Thus, the creep deformation amount of the fusible piece 14D and the increase in the outer diameter of the fusible piece 14D can be suppressed.

Other than the above, the fusible plug type pressure relief valve 1D has the same operational advantages as the fusible plug type pressure relief valve 1 of the first embodiment.

Sixth Embodiment

Figure 7:
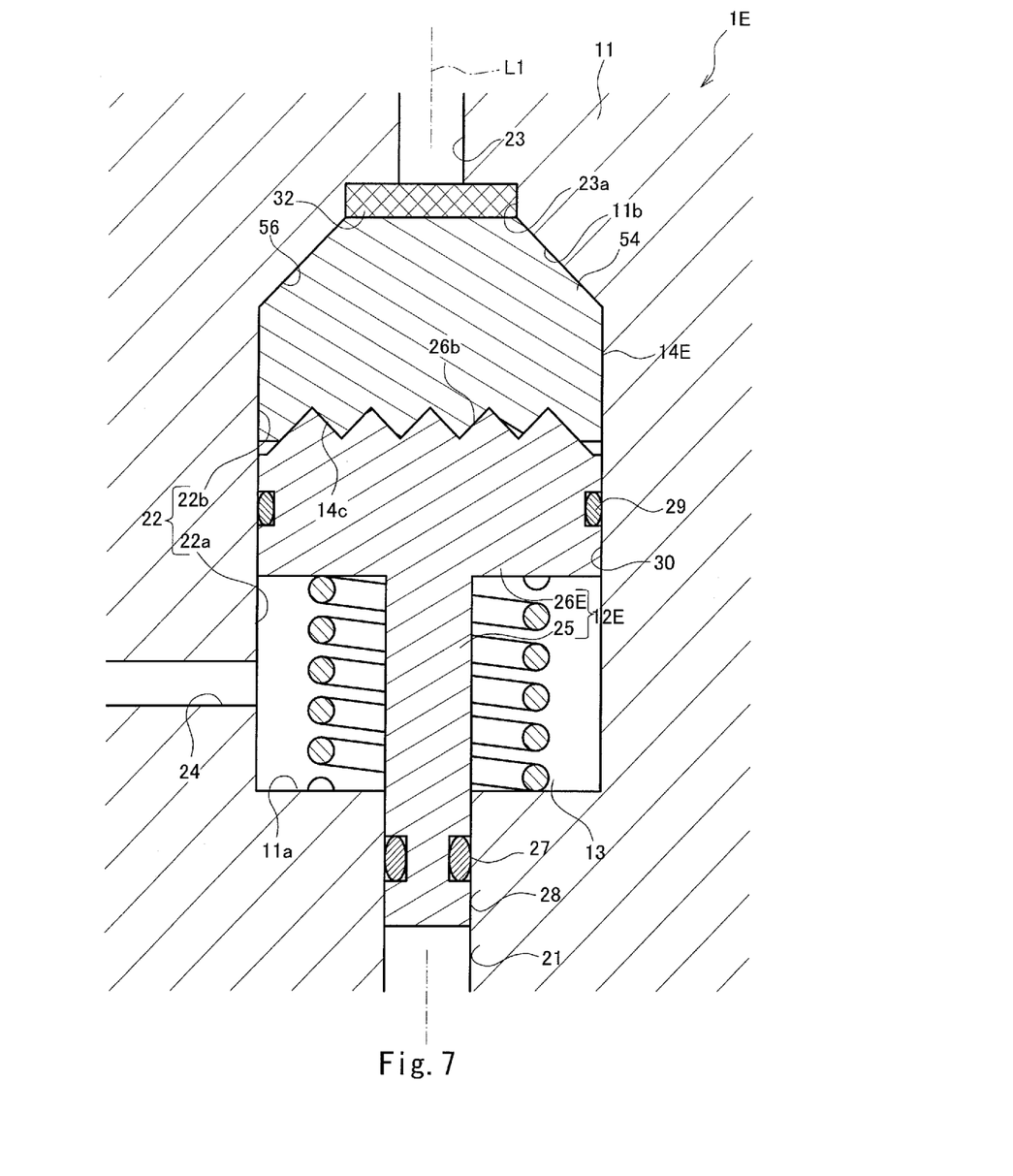
FIG. 7 is a cross-sectional view showing the fusible plug type pressure relief valve of a sixth embodiment.

As shown in FIG. 7, in a fusible plug type pressure relief valve 1E of the sixth embodiment, an upper end surface of a piston 26E of a valve element 12E has a zigzag cross section. A lower end portion of a fusible piece 14E has a zigzag cross section corresponding to the upper end surface of the piston 26E. An upper end surface 26b of the piston 26E is engaged with and contacts a lower end surface 14c (contact surface) of the fusible piece 14E. Therefore, the reaction force acting on the fusible piece 14A from the piston 26E can be dispersed, and therefore, the surface pressure acting on the fusible piece 14E can be reduced. With this, the creep deformation amount of the fusible piece 14E and the increase in the outer diameter of the fusible piece 14E can be suppressed.

Other than the above, the fusible plug type pressure relief valve 1E has the same operational advantages as the fusible plug type pressure relief valve 1 of the first embodiment.

Other Embodiment

In the fusible plug type pressure relief valves 1 and 1A to 1E of the first to sixth embodiments, each of the fusible pieces 14 and 14A to 14E has a solid disc shape but may be an annular disc shape.

In the fusible plug type pressure relief valves 1 and 1A to 1E of the first to sixth embodiments, the contact surface between the fusible piece (14, 14A, 14B, 14C, 14D, or 14E) and the valve element (12, 12A, 12B, 12C, 12D, or 12E) has a substantially truncated cone shape, a partially spherical shape, or a zigzag cross section. However, the shape of the contact surface is not limited to these. For example, the contact surface may have a wave shape, and the contact surface is only required to include an inclined portion that is inclined relative to the axis line L1 (i.e., relative to the open direction). In the fusible plug type pressure relief valves 1 and 1A to 1E of the first to sixth embodiments, each of the upper and lower end surfaces of the fusible piece (14, 14A, 14B, 14C, 14D, or 14E) includes the inclined portions. However, only one of the upper and lower end surfaces is required to include the inclined portions. To be specific, only one of the supporting surface and the contact surface is required to include the inclined portions.

From the foregoing explanation, many modifications and other embodiments of the present invention are obvious to one skilled in the art. Therefore, the foregoing explanation should be interpreted only as an example and is provided for the purpose of teaching the best mode for carrying out the present invention to one skilled in the art. The structures and/or functional details may be substantially modified within the scope of the present invention.

REFERENCE SIGNS LIST 1, 1A to 1E fusible plug type pressure relief valve
11, 11A housing
12, 12B to 12E valve element
13 spring member
14, 14A to 14E fusible piece
14a upper end surface
14b, 14c lower end surface
21 valve passage
26a upper end surface
26b upper end surface
32 porous member
41, 41C convex portion
41B concave portion
51, 51C concave portion
51B convex portion
54 convex portion
55, 55B tapered portion
56 tapered portion

The invention claimed is:

1. A fusible plug type pressure relief valve comprising:
   a housing in which a valve passage is formed;
   a valve element arranged at a closed position in the housing and movable to an open position, the closed position being a position at which the valve element closes the valve passage, the open position being a position at which the valve element opens the valve passage;
   a pressing member configured to press the valve element in an open direction that is a direction from the closed position toward the open position; and
   a supporting body supporting the valve element against pressing force of the pressing member and configured to melt at not less than a predetermined melting temperature,
   a contact surface of the supporting body contacting the valve element to support the valve element, and
   the contact surface of the supporting body including an inclined portion inclined relative to an axis line of the valve element.

2. The fusible plug type pressure relief valve according to claim 1, wherein:
   the supporting body includes a concave portion located at the valve element side;
   the valve element includes a convex portion located at the supporting body side, the convex portion being fitted in the concave portion;
   an inner peripheral surface of the concave portion contacts an outer peripheral surface of the convex portion to constitute the contact surface; and
   the contact surface includes the inclined portion inclined relative to the axis line of the valve element.

3. The fusible plug type pressure relief valve according to claim 2, wherein each of the convex portion and the concave portion has a substantially truncated cone shape.

4. The fusible plug type pressure relief valve according to claim 3, wherein:
   the supporting body includes a supporting surface which contacts and is supported by the housing; and
   the supporting surface is inclined relative to the axis line of the valve element.

5. The fusible plug type pressure relief valve according to claim 2, wherein each of the convex portion and the concave portion has a substantially partially spherical shape.

6. The fusible plug type pressure relief valve according to claim 5, wherein:
the supporting body includes a supporting surface which contacts and is supported by the housing; and
the supporting surface is inclined relative to the axis line of the valve element.

7. The fusible plug type pressure relief valve according to claim 2, wherein:
the supporting body includes a supporting surface which contacts and is supported by the housing; and
the supporting surface is inclined relative to the axis line of the valve element.

8. The fusible plug type pressure relief valve according to claim 1, wherein:
the valve element includes a concave portion located at the supporting body side;
the supporting body includes a convex portion located at the valve element side, the convex portion being fitted in the concave portion;
an outer peripheral surface of the convex portion contacts an inner peripheral surface of the concave portion to constitute the contact surface; and
the contact surface includes the inclined portion inclined relative to the axis line of the valve element.

9. The fusible plug type pressure relief valve according to claim 8, wherein each of the convex portion and the concave portion has a substantially truncated cone shape.

10. The fusible plug type pressure relief valve according to claim 9, wherein:
the supporting body includes a supporting surface which contacts and is supported by the housing; and
the supporting surface is inclined relative to the axis line of the valve element.

11. The fusible plug type pressure relief valve according to claim 8, wherein each of the convex portion and the concave portion has a substantially partially spherical shape.

12. The fusible plug type pressure relief valve according to claim 11, wherein:
the supporting body includes a supporting surface which contacts and is supported by the housing; and
the supporting surface is inclined relative to the axis line of the valve element.

13. The fusible plug type pressure relief valve according to claim 8, wherein:
the supporting body includes a supporting surface which contacts and is supported by the housing; and
the supporting surface is inclined relative to the axis line of the valve element.

14. The fusible plug type pressure relief valve according to claim 1, wherein:
the supporting body includes a supporting surface which contacts and is supported by the housing; and
the supporting surface is inclined relative to the axis line of the valve element.

15. A fusible plug type pressure relief valve comprising:
a housing in which a valve passage is formed;
a valve element arranged at a closed position in the housing and movable to an open position, the closed position being a position at which the valve element closes the valve passage, the open position being a position at which the valve element opens the valve passage;
a pressing member configured to press the valve element in an open direction that is a direction from the closed position toward the open position;
a supporting body supporting the valve element against pressing force of the pressing member and configured to melt at not less than a predetermined melting temperature; and
a porous member interposed between the supporting body and the valve element,
the supporting body including a contact surface between the supporting body and the porous member and contacting the porous member to support the valve element.

16. The fusible plug type pressure relief valve according to claim 15, wherein the porous member is a porous body or wire mesh mold product which is constituted by ceramics or a sintered member.

17. A fusible plug type pressure relief valve comprising:
a housing in which a valve passage is formed;
a valve element arranged at a closed position in the housing and movable to an open position, the closed position being a position at which the valve element closes the valve passage, the open position being a position at which the valve element opens the valve passage;
a pressing member configured to press, along an open direction, the valve element toward the open position from the closed position; and
a fusible piece supporting the valve element against pressing force of the pressing member and configured to melt at not less than a predetermined melting temperature,
the fusible piece including a supporting surface which contacts and is supported by the housing, and
the supporting surface is inclined relative to the open direction.

18. The fusible plug type pressure relief valve according to claim 17, wherein:
the fusible piece is interposed between the housing and the valve element along the open direction.

* * * * *